Dec. 4, 1962   A. T. GOLDBECK   3,066,581
SELF TENSIONING REINFORCEMENT FOR PAVEMENT AND ITS USE
Filed April 30, 1958   2 Sheets-Sheet 1
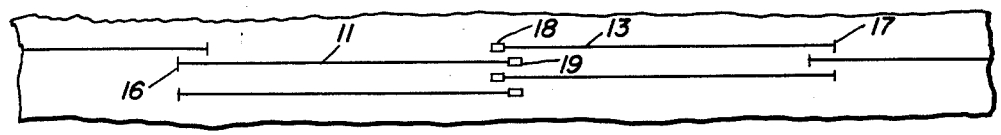
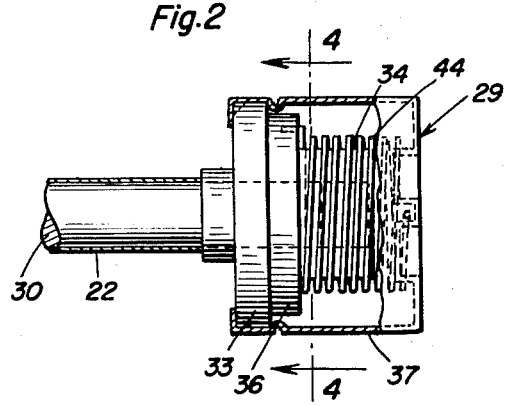
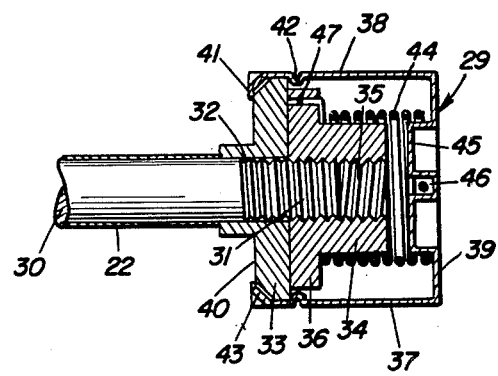
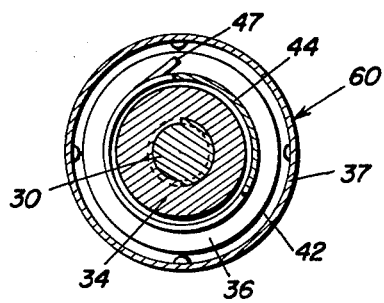
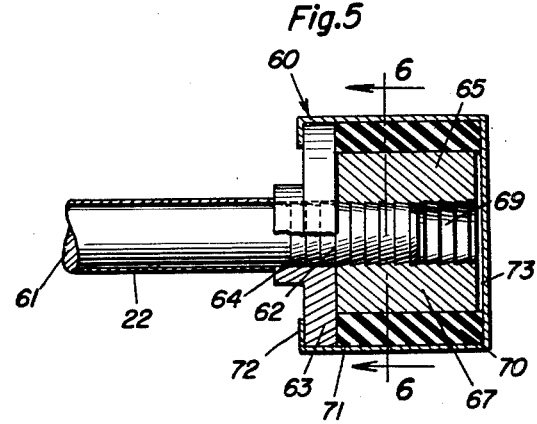
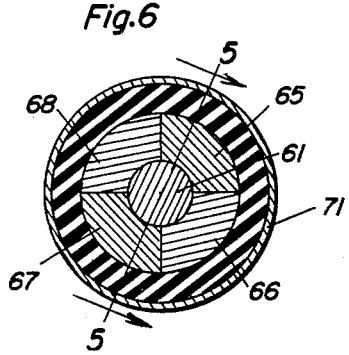
Albert T. Goldbeck
INVENTOR.

Dec. 4, 1962  A. T. GOLDBECK  3,066,581
SELF TENSIONING REINFORCEMENT FOR PAVEMENT AND ITS USE
Filed April 30, 1958  2 Sheets-Sheet 2

Albert T. Goldbeck
INVENTOR.

BY *[signature]*
*and [signature]*
Attorneys 3,066,581
SELF TENSIONING REINFORCEMENT FOR
PAVEMENT AND ITS USE
Albert T. Goldbeck, 7105 Beechwood Drive,
Chevy Chase 15, Md.
Filed Apr. 30, 1958, Ser. No. 731,963
1 Claim. (Cl. 94—8)

This invention relates to reinforced concrete pavements and more particularly to improvements in continuously reinforced concrete pavements.

The continuously reinforced concrete pavements which have been reported to the Highway Research Board have one characteristic in common. They all show frequent transverse cracking (roughly 20 cracks per 100 ft.) extending over a long middle zone with a tendency to become more frequent (say, roughly 30 cracks per 100 ft.) over several hundred feet at the ends of this central zone, and beyond the central zone the cracks rapidly become less frequent toward the extreme ends of the project. This is so in the Illinois tests (report 1958 by Lindsay), and Van Breemen of New Jersey states "The 3500 ft. central regions of the inside lanes of both sections have remain essentially at constant length at all times (this does not apply to the outside lanes, owing to certain failures in these lanes)." Van Breemen also states "6.— The central regions of both sections have a very large number of transverse cracks. These cracks are of an extremely erratic nature and their spacing ranges from as little as six inches to as much as 20 feet. Many of these cracks occurred immediately after construction, within a matter of days, and practically all of the remainder occurred within the next three years." Witkoski and Shaffer, in connection with the Berks County, Pennsylvania, pavement, have reported at 3 months up to 14 cracks per 100 ft.

Another phenomenon that has been observed is the relatively wider opening of cracks at the pavement surface compared with their width at lower levels. Mr. Lindsay of Illinois has suggested that the surface opening is about twice the actual width of the cracks. This greater surface opening of cracks perhaps can be explained by shrinkage due to greater drying of the concrete at the surface. (Concrete shrinks about 0.003 to 0.0005 in. per in. depending upon the completeness of drying). A shrinkage of 0.0001 would produce a tensile stress of $E \times e = 4,000,000 \times 0.0001 = 400$ p.s.i., which greatly exceeds the tensile strength of concrete at 28 days.

The forces tending to produce frequent transverse cracking in the long center zone seem to be complex. This zone is under restraint at its assumed ends, some 300 to 400 feet from the free ends. The steel generally expands and contracts more than the concrete and, hence, since it is in bond, it influences the stress in the concrete and the greater the percentage of steel, the greater will be its stressing effect on the concrete. Therefore, there is a difference in frequency of cracking depending on the percentage of steel. Thus the central zone in the Illinois tests, over a distance of 2500 feet showed approximate crack frequencies as follows, as estimated from FIG. 1 in Lindsay's 1957 Highway Research Board Report.

Percent steel: Approximate crack frequency per 100 ft.
1.0 ------------------------------------- 25
0.7 ------------------------------------- 20
0.5 ------------------------------------- 18
0.3 ------------------------------------- 10

The greater the percentage of steel in bond, the more frequent is the cracking.

The invention suggests the thought that if the bond were reduced to zero, then compression or tension in the steel could not be transmitted as tension to the concrete. It would be very desirable if the concrete could be subjected in direct stress only to compression and not to tension. That would result in tensile stresses due only to bending in flexure such as produced by warping and traffic loads. An object of the invention is to provide a highway using continuous steel in a manner which would never subject the concrete to direct tension and which would automatically tighten itself and tend to hold the slabs together keeping the cracks to a minimum width and thus help preserve aggregate interlock. Also it would be desirable and it is a part of the objective of the invention, to prevent any jagged cracks from forming at the pavement surface and likewise the control of their spacing to, say, not over 20 feet apart. This would be extremely desirable. Twenty feet would take care of warping stresses in most cases. Fifteen feet might be desirable with some coarse aggregates and twenty-five feet would be permissible with others. The sawing of the pavement surface to create planes of weakness would make a series of transverse joints which would have a designed appearance as contrasted with random jagged cracks.

The following method is suggested as a procedure for practicing the invention and accomplishing this foregoing objective—briefly, it is proposed to use smooth longitudinal bars of designed size and spacing, each bar being coated to prevent any bond with the concrete. Thick, heavy graphite grease or its equivalent, as opposed to ordinary grease or oil, is suggested. Its use in combination with a cutback asphalt would be suitable. One end of the bar is provided with a proper anchor such as a heavy washer and nut. The other end of the bar is designed to fit into a socket or sleeve so arranged that the bar may enter the socket with ease but is held there tightly so that it cannot be withdrawn. Similar combinations of bars with their connecting sockets or sleeves are laid throughout the length of the project with no joints in the pavement initially. The invention contemplates a large number of devices for locking the bars after the expansion of the reinforcing bars and retaining the bars for later conversion into tensile stress, only some of which are shown, and later described.

In one embodiment, the bar or rod is threaded at end. A washer (not threaded) slips on the rod. A torsion spring has one end fitting into a flange of a nut behind the spring, the other end of the spring ending at and engaging a depression in a pressed steel cover. When this end assembly is made, the washer is held in the proper fixed position with relation to the rod. The nut which should turn easily by hand is brought up against the washer. The spring is mounted with its two ends in proper position and the cover is now given some 8 turns (assuming $\frac{1}{32}$ in. of screw threads) and while held in that position is pressed over the washer, and the ends are bent, as shown, to hold cover in place with respect to the washer.

Should the rod expand due to rising temperature, or should the concrete shrink due to drying, the rod will move into the end assembly, will cause a separation at the juncture of the washer and flange of the nut; the spring being under torsion will turn the nut to close this separation and hence this expansion of the rod is "captured" so that the rod will be subjected to tension when subsequent contraction takes place.

In another embodiment a rod or bar is threaded at one end. A washer (not threaded) slips over the rod. Wedges fitted with springs fit as shown. The nut is adjusted to proper position to hold wedges in position and with the end of the rod adjusted to protrude beyond head of nut.

The spring is put in position and a pressed steel cover is pressed into place and fastened to the washer by bending tongues over the edges of the washer.

Should the rod move into its end assembly for any cause (differential movement of rod and cover) the springs will move the wedges to reduce the space thus created between the washer and wedges and hence, the expansion of the rod is permanently captured.

A further embodiment employs a principle which probably is somewhat different. A bar or rod has grooves. Pawls for instance four of them are similarly grooved and are held in place by rubber cushion which is retained in a pressed steel container. The pawls may be grooved so that opposite pawls are raised when the other pair are in lowered position, thus permitting of the pawls catching the rod for each half groove advance of the rod instead of for each full groove advance. In operation as the rod is expanded more than the concrete by temperature rise, the rod advances into the end assembly, raises two opposite pawls until they may be forced into their holding position. Thus the expansion of the rod is "captured" for future use in creating tension in the rod when the temperature decreases. During construction it is suggested that 40 ft. rods be used and both the anchored end and the sleeve end overlap its longitudinal neighbor by 12 in., more or less. Each 40 ft. bar will be handled as an individual unit. When the temperature of the pavement rises, the bars will further enter their sleeves and when the temperature falls, the bars will contract more than the concrete and will tend to hold the cracks together wherever they form. This proposed system should be suitable for continuously reinforced pavements from which the undesirable, frequent, ragged, transverse cracks will be eliminated and in their place will be sawed joints about 20 ft. apart. Should the cracks at 20 ft. intervals be too wide for proper protection of the steel and for proper retention of aggregate interlock, then some cracks can be grouted during moderately cool weather with Portland cement grout. This would serve both of the above purposes and the load carrying capacity and life of the road should be thereby improved.

A further object of the invention is to provide improvements in the end assemblies that are operatively connected to one end of each rod. These improvements involve the actual construction of several modifications of this feature of the invention. Each of the modifications can be used individually, that is, with a single rod or bar or can be used as a multiple rod or bar assembly. The procedure would be to have either a single cover or two covers rigidly attached together and duplicate mechanisms within the cover to support the spaced, confronting ends of longitudinally adjacent rods.

A further object of the invention is to improve a continuously reinforced concrete pavement by the application of reinforcing rods in a particular way. When a plurality of rods of reasonable length are used in the pavement, one end of each rod is anchored in the customary way. The opposite end of each rod is made free to extend but cannot return to the original, shorter length. One of the very important features of this invention is that the rods or bars are not bonded with the concrete within which they are embedded. This leaves the rods free to increase in length, for example in response to a temperature increase as would be experienced in the summertime. Therefore there is no tensile stress transmission from the rods to the concrete, and the corresponding strain ordinarily existent in concrete where there is a bond between the rods and the concrete, does not exist.

After the rods have been extended and clamped in the extended position, they cannot return when the temperature drops, for example in the fall or winter of the year in comparison to the summertime. A compressive strain exists in the concrete when the rods tend to contract since both ends of the rods are held fixed, one by the conventional anchor and the other by one of the end assemblies constructed in accordance with the invention. The compression, applied by the rods or bars is most desirable to overcome the difficulties described previously.

Other objects and features of importance will become apparent in following the description of the illustrated forms of the invention.

FIGURE 1 is a schematic plan view of a part of a pavement while it is under construction and showing one suggested arrangement of continuous reinforcement rods or bars.

FIGURE 2 is an elevational view of one end assembly, parts shown in section to illustrate otherwise hidden detail.

FIGURE 3 is a longitudinal sectional view of the end assembly in FIGURE 2.

FIGURE 4 is a transverse sectional view taken on the line 4—4 of FIGURE 2.

FIGURE 5 is a longitudinal sectional view of a modification of the end assembly and taken on the line 5—5 of FIGURE 6.

FIGURE 6 is a transverse sectional view taken on the line 6—6 of FIGURE 5.

Figure 12:
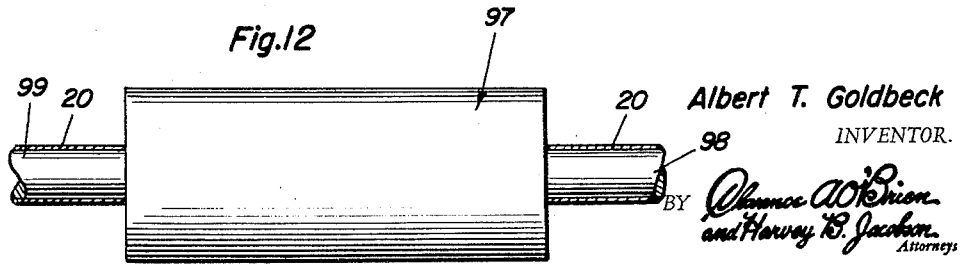
FIGURE 12 is an elevational view showing by schematic representation the option of having an end assembly constructed as in any of the previous figures and with a double internal mechanism by which to accept and hold the confronting ends of longitudinally adjacent rods.

In the accompanying drawings, FIGURE 1 represents a part of a pavement while under construction. This is a typical arrangement for continuously reinforced concrete pavements in that the rods are disposed lengthwise of the pavement and have their ends slightly overlapped, continuing for the length of the highway or whatever is being constructed. Rods 11 and 13 have anchors 16 and 17 at their outer ends and they consist of conventional structures such as a nut and washer for each anchor. The confronting or adjacent ends of the rods 11 and 13 have end assemblies or structures 18 and 19 which are fixed in the concrete, as are the anchors 16 and 17. However the end assemblies 18 and 19 may be of a number of types such as those illustrated in FIGURES 2–10 or others or may be of the multiple type such as shown in FIGURE 12. The common feature of any of these anchors is that they permit the rods to extend but prevent the rods from returning to the original position after extension.

Each rod is coated with a material that prevents a bond from being formed between the surfaces of the rods and the concrete. The coating 20 (FIG. 12) on the typical rods should be thick, heavy graphite grease or its equivalent. A use of such grease in combination with cutback asphalt is suitable. This will be far superior to ordinary oil or grease since the ability of the rods to move freely in the pavement (without bonding with the concrete) is very important. The reasons for this have been discussed herein.

Figure 7:
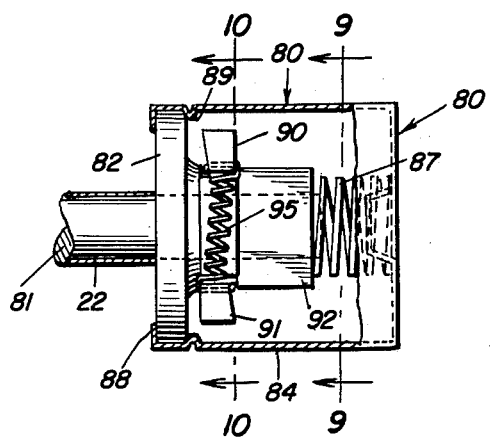
FIGURE 7 is an elevational view, part shown in section, of another modification of the end assembly.
Figure 8:
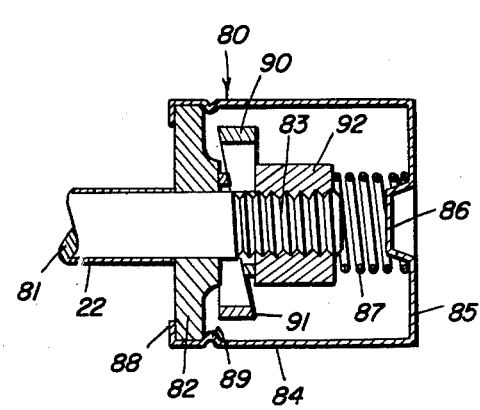
FIGURE 8 is a longitudinal sectional view of the end assembly in FIGURE 7.
Figure 9:
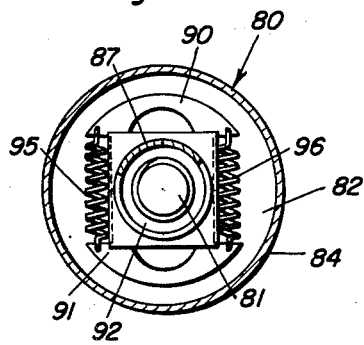
FIGURE 9 is a transverse sectional view taken on the line 9—9 of FIGURE 7.
Figure 10:
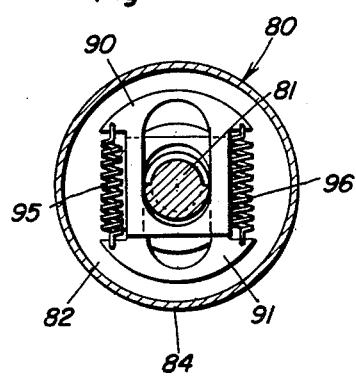
FIGURE 10 is a sectional view taken on the line 10—10 of FIGURE 7.
Figure 11:
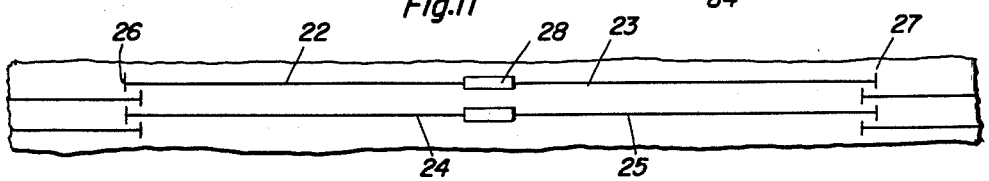
FIGURE 11 is a fragmentary, schematic plan view of a pavement while under construction, showing an alternate manner of anchoring the free ends of rods and anchoring the adjacent, confronting ends of longitudinally adjacent rods.

FIGURE 11 shows a pavement that is under construction and illustrates a general modification of the invention. A number of rods, such as rods 22, 23, 24 and 25 are shown. Instead of having the ends overlapped, longitudinally adjacent rods have their ends in axial alignment and slightly spaced from each other. The outer ends of each pair, for example rods 22 and 23, are fitted with conventional anchors 26 and 27 which becomes embedded and anchored in the concrete thereby anchoring the outer ends of the pair of rods 22 and 23. The inner, confronting ends of the rods 22 and 23 are fitted into the end assembly 28. End assembly 28 can be the same as the end assemblies shown in detail in FIGURES 2–10, or can be of some other configuration so long as the intended purpose of the end assembly 28 is served. That purpose is to permit the rods 22 and 23, which are coated with a substance that is non-binding with the concrete, to move rather freely with respect to the concrete upon initial expansion of the rods, and to prevent the rods from retracting to their original position after extension by expansion. It is now quite apparent that this invention has an arrangement of reinforcing rods especially useful for continuously reinforced concrete pavements and which transmit no compressive force to the concrete upon initial extension of the rods due to heat expansion. Yet, the concrete is compressively stressed when the rods try to return to their original length. This action on the concrete will prevent or very materially attenuate the cracking problem in continuously reinforced concrete pavements and will tend to compressively stress the concrete. The advantages of this system of reinforcement which automatically helps to tension the steel, which in turn can transmit only compression to the concrete and thus assist in preserving aggregate interlock in the concrete are obvious.

Referring now to FIGURES 2–4, end assembly 29 is shown connected to a typical bar or rod 30 that has a coating 22 of non-bonding material on its surface. Rod 30 has a threaded end 31 that is passed through the non-threaded bore or passage 32 of washer 33. Nut 34 has a threaded bore 35 that accepts the threaded end 31 of rod 30. Flange 36 is on nut 34 and abuts the confronting face of washer 33. Washer 33 is held fixed within a cover 37 constructed of a cylindrical case, although the shape may be varied. In addition should the advantage justify the additional expense, anchors may be on the case 37. The case has a side wall 38 enclosing the nut 34 and washer 33, an end wall 39 and an open front 40 that is closed by the washer 33 and rod 30 in the washer. An inward flange 41 holds the washer captive in the cover by projecting over a small part of the front surface of the washer. A small part of the rear surface of the washer abuts the annular rib 42 extending inwardly from the side wall 38 of the cover and spaced sufficiently from flange 41 so that washer 33 is held captive therebetween. If desired, there may be means for preventing the washer from rotating such as small keys 43 at the junction of flange 41 and the wall at the front corner of the washer 33.

Torsion spring 44 is in housing 37 and has one end fitted over seat 45 formed as a depression in wall 39. There is a channel 46 in seat 45, and the walls of the channel have the end of the spring nested therebetween to form a reaction point for the spring when it is subjected to a torsion load. The opposite end of the spring is fitted over the outside surface of nut 34 with the extremity of the spring in an anchoring passage 47 formed in the flange 36 of nut 34.

In use, assume that the pavement is poured in the spring-time. With the approach of summer rod 30 becomes warmer and as a result, it elongates. Since the rod can slide axially in the concrete the rod 30 will move into the end assembly 29. The inward movement of rod 30 with nut 34 attached now tends to cause nut 34 to separate from washer 33. Torsion spring 44 now turns nut 34 until the separation between nut 34 and washer 33 is again reduced to zero. Therefore the expansion in the rod is "captured." When the rod is subjected to tension (for instance when it again becomes cooler) compression is introduced into the concrete. As indicated herein the elongation of the rod 30 is only one of the causes contributing to cracking of the pavements. Another cause which will be very much corrected in its results on the concrete, is concrete shrinkage due to drying. As the concrete shrinks due to drying, the steel rods are not similarly affected and hence would show expansion relative to the concrete and this relative expansion would be captured for subsequent conversion to tension during periods of steel contraction.

Reference is now made to FIGURES 4–6 where end assembly 60 is shown in detail. Rod 61 is shown with the coating 22 thereon and has an end 62 provided with grooves. Non-grooved washer 63 has a bore 64 through which the grooved end 62 of rod 61 is passed. A plurality of pawls 65, 66, 67 and 68 have annular surfaces provided with teeth 69 that engage the grooved end 62 of rod 30. Resilient means, for example rubber cushions 70, are around the outer surface of the pawls. The cushion may assume the form of a rubber sleeve, and the force exerted by the cushion 70 is in a direction which forces the pawls radially inwardly of rod 61. Cover 71 has a side wall, for example cylindrical, with an end flange 72 whose surface contacts the front face of washer 61. There is a back wall 73 in the cover thereby enclosing the pawls and the grooved end 62 of rod 61.

In use, should rod 61 move into end assembly 60 for any cause whatsoever, the pawls anchor the rod 61 and prevent its return. The pawls may have their teeth arranged so that opposite pawls are raised when the other pair are lowered in the grooves of end 62, thereby permitting two of the pawls to attach to the rod and hold it, for each half groove advance of the rod. As the rod 61 elongates, for instance the steel rod expands more than the concrete of the pavement due to a temperature rise, the rod advances into the end assembly, raising two opposite pawls against the yielding opposition of cushion 70. When the rod 61 moves far enough so that these pawls can fall behind the groove that is raising them, the cushion 70 forces the pawls into engagement with the grooves, but at the same time this same motion of rod 61 has caused the other two pawls to move part way up their grooves. As a result the expansion of the rod is "captured" for future use in creating tension in the rod 61 when the temperature again decreases.

Reference is now made principally to FIGURES 7–10. End assembly 80 serves the same purpose as the previously described end assemblies and is shown attached to a typical reinforcing rod 81 provided with coating 22. The rod 81 has a threaded end 83 and is passed through a non-threaded washer 82. This washer is held in cover 84 constructed very much like cover 37. It has an end wall 85 provided with a spring center 86 that projects inwardly of one end of spring 87 in cover 84. The opposite end of the cover 84 is open except for inwardly extending flange 88 that abuts the front face of washer 82. The rear face has its edge in abutment with an inwardly extending rib 89 in the side wall of cover 84. The washer is held captive between flange 88 and rib 89.

Substantially U-shaped wedges 90 and 91 are overlapped and fit between the rear face of washer 82 and nut 92. The nut is threaded on the end of rod 81 and has one surface in contact with spring 87. Nut 92 is adjusted to proper position to hold the wedges 90 and 91 in position and with the end of the rod 81 adjusted to protrude beyond the head of the nut. This part of the rod forms the other pilot or center for spring 87.

In case of end assembly 80, should the rod 81 move into its end assembly for any cause whatsoever the springs 95 and 96 that are attached at their ends to the two wedges, and tend to pull the wedges together in further overlapped relationship, are slid over each other occupying the space between the adjacent surfaces of washer 82 and nut 92, which is formed as the rod 81 moves inwardly of the comparatively stationary end assembly cover 84. Since the wedges take up this space, it is not possible for the rod 81 to return to its non-extended position.

The end assemblies can be manufactured by any manufacturing techniques and can be preassembled on the rods or assembled on the rods or assembled on the job. The former manner of handling the invention, that is preassembly is probably more practical, although the invention contemplates the various alternate procedures and uses.

In FIGURE 12 end assembly 97 is shown with two rods 98 and 99 projecting from opposite ends of its cover. These rods are coated with the non-bonding substance 20 for the same purpose that the previously described rods are coated. The purpose of FIGURE 12 is to show that the rods need not have separate end assemblies. On the contrary, two end assemblies can be put together in a common cover as shown in FIGURE 12, and this would mean the joining of the adjacent ends of two rods or bars 98 and 99 but each would operate independently of the other. The cover of end assembly 97 would house two mechanisms, for example any of the mechanisms shown in FIGURES 2–10 or any other modification of the invention.

Although the drawings have illustrated therein a number of structures for end assemblies and although FIGURES 1 and 11 show two specific applications of the improvements in continuously reinforced concrete pavements, there is another important phase of this invention and that is the method of providing the improvements in the pavement regardless of the structure used. The steps are lubricating the rods, locating and supporting them parallel with one another with ends confronting or overlapped prior to placing the concrete or the concrete may be placed and struck off to the required depth, the rods then laid in position and covered with the top layer of concrete which is properly struck off and surface finished. When the concrete hardens the anchor or fixed end of each rod is held tightly in the concrete. Should the rod expand its movable end will expand into its end sleeve and this expansion will be permanently "captured." Where the rods tend to shorten, compression is applied to the surrounding concrete.

Considering what happens within the concrete, the process or method entails the steps of applying lubricated rods between the forms and in the proper relationship to each other and then pouring the concrete thereover. Then, the rods are freely slid as they elongate in and with respect to the concrete. The next step is achieved when the rods tend to return to their original or at least shorter condition. This last step is the application of compression to the concrete of the povement so that the resulting pavement is compressed in a longitudinal direction with respect to the length dimension of the pavement, for example a highway.

The described methods achieve the ends of this invention which include improving the strength and durability of the pavement by correcting a major cause of difficulty namely; the formation of many wide cracks and in a very poor pattern as has been experienced in recent years. What cracks there are can be regularly spaced by the use of transverse saw cuts or other ways of providing transverse weakened planes in the concrete within which the cracks, if any, will form. Should cracks or joints become too wide due to excessive concrete shrinkage or thermal contraction, such cracks may be closed by grouting and this should tend to reduce in width other pavement cracks or joints so as to prevent rusting of steel or destruction of aggregate interlock.

Various changes and modifications that fall within the scope of the following claim may be made.

Having described the invention what is claimed as new is as follows:

In a continuously reinforced concrete pavement which has both concrete and substantially parallel embedded rods extending in a lengthwise direction of the concrete, said rods having a lubricant coating, an end structure connected with said rods, said end structure comprising a cover anchored to the concrete, means in said cover and connected to an end of one of said rods receiving said rod as it elongates and preventing said rod from returning when said rod tends to reduce in length, said means including a threaded nut for exerting force on the concrete, the end of said rod having threads thereon engaging the threads of said nut, and resilient means interconnecting the cover and the nut and biasing said nut in a rotational direction for moving the nut inwardly longitudinally of the rod when said rod elongates, a washer having an opening, said rod end extending through said opening, and means attaching said washer to said cover.

References Cited in the file of this patent

UNITED STATES PATENTS

| 2,029,892 | Olmstead | Feb. 4, 1936 |
| 2,329,189 | Dill | Sept. 14, 1943 |
| 2,386,473 | Kanary | Oct. 9, 1945 |
| 2,695,754 | Karig | Nov. 30, 1954 |
| 2,827,770 | Bakker | Mar. 25, 1958 |
| 2,857,755 | Werth | Oct. 28, 1958 |

FOREIGN PATENTS

| 163,172 | Australia | 1955 |

OTHER REFERENCES

The Preload System Co. 1730 Grand Central Terminal Bldg., New York, Nov. 23, 1942, page 20.

German printed application of Tegernsee, v7380v/19c; 1956.